United States Patent

Marshall

(10) Patent No.: US 8,851,438 B2
(45) Date of Patent: Oct. 7, 2014

(54) FIXTURE FOR SECURING A THIN-WALLED COMPONENT

(75) Inventor: Matthew Marshall, Sheffield (GB)

(73) Assignee: Rolls-Royce PLC, London (GB)

( * ) Notice: Subject to any disclaimer, the term of this patent is extended or adjusted under 35 U.S.C. 154(b) by 148 days.

(21) Appl. No.: 13/148,591

(22) PCT Filed: Jan. 25, 2010

(86) PCT No.: PCT/EP2010/000405
§ 371 (c)(1),
(2), (4) Date: Sep. 27, 2011

(87) PCT Pub. No.: WO2010/094381
PCT Pub. Date: Aug. 26, 2010

(65) Prior Publication Data
US 2012/0032053 A1  Feb. 9, 2012

(30) Foreign Application Priority Data
Feb. 20, 2009  (GB) .................................. 0902790.5

(51) Int. Cl.
*A47B 91/00* (2006.01)
*B23Q 3/06* (2006.01)
*B23Q 11/00* (2006.01)
*B25B 5/06* (2006.01)
*B23B 31/30* (2006.01)

(52) U.S. Cl.
CPC ............ *B23Q 3/062* (2013.01); *B23Q 11/0032* (2013.01); *B25B 5/065* (2013.01); *B23B 31/305* (2013.01)
USPC .............. 248/346.2; 248/346.01; 248/346.02; 279/2.07; 269/22

(58) Field of Classification Search
USPC .................... 279/4.03–4.05, 2.06–2.08, 4.11; 248/346.01, 346.02, 346.2; 294/98.1
See application file for complete search history.

(56) References Cited

U.S. PATENT DOCUMENTS

| | | | | | |
|---|---|---|---|---|---|
| 2,534,527 | A | * | 12/1950 | Myers | 279/4.03 |
| 3,025,072 | A | * | 3/1962 | Cahill | 279/4.05 |
| 3,542,354 | A | * | 11/1970 | Fitzpatrick | 269/22 |
| 3,679,219 | A | * | 7/1972 | Cameron | 279/4.03 |
| 4,014,311 | A | * | 3/1977 | Steere, Jr. | 125/13.02 |

(Continued)

FOREIGN PATENT DOCUMENTS

GB  2 337 711 A  12/1999
WO  WO 2008/107672 A1  9/2008

OTHER PUBLICATIONS

Apr. 26, 2010 International Search Report in related International Appln. No. PCT/EP2010/000405.

*Primary Examiner* — Terrell McKinnon
*Assistant Examiner* — Monica Millner
(74) *Attorney, Agent, or Firm* — Oliff PLC

(57) ABSTRACT

A fixture for securing a thin-walled component includes a support having one or more securing devices for securing the component to the support. An inflatable pressure element is adapted to press, when inflated, against a flexible liner located adjacent the thin wall of the component. The inflated pressure element and the liner act to damp vibrations in the component during machining of another side of the thin wall. The liner has at least one stiffening element located opposite a position where a machining operation is performed on the other side of the thin wall. The stiffening element holds the liner away from the thin wall to create a cavity between the liner and the thin wall.

13 Claims, 3 Drawing Sheets

(56) References Cited

U.S. PATENT DOCUMENTS

| | | | | |
|---|---|---|---|---|
| 4,229,014 A | * | 10/1980 | Crowe | 279/2.07 |
| 4,669,226 A | * | 6/1987 | Mandler | 451/384 |
| 4,677,792 A | * | 7/1987 | Speidel | 451/342 |
| 4,730,382 A | * | 3/1988 | Parsons | 29/563 |
| 4,958,969 A | * | 9/1990 | Och | 409/234 |
| 4,989,909 A | * | 2/1991 | Bouligny et al. | 294/119.3 |
| 5,429,375 A | * | 7/1995 | Mueller et al. | 279/2.02 |
| 5,429,376 A | * | 7/1995 | Mueller et al. | 279/4.07 |
| 5,516,243 A | * | 5/1996 | Laube | 408/239 R |
| 5,947,662 A | * | 9/1999 | Becker et al. | 409/131 |
| 6,015,154 A | * | 1/2000 | Andre et al. | 279/2.07 |
| 6,077,003 A | * | 6/2000 | Laube | 409/234 |
| 6,182,977 B1 | * | 2/2001 | Weller | 279/2.08 |
| 6,302,364 B1 | * | 10/2001 | Chiueh | 248/311.2 |
| 6,547,228 B1 | * | 4/2003 | Schmalz et al. | 269/21 |
| 7,147,232 B2 | * | 12/2006 | Andre, Sr. | 279/2.05 |
| 7,316,403 B2 | * | 1/2008 | Andre et al. | 279/4.03 |
| 7,331,583 B1 | * | 2/2008 | Andre | 279/4.03 |
| 7,374,178 B2 | * | 5/2008 | Andre et al. | 279/4.03 |
| 7,469,907 B2 | * | 12/2008 | Laube et al. | 279/43.4 |
| 7,530,487 B2 | * | 5/2009 | Kyriakoglou | 228/112.1 |
| 8,424,857 B2 | * | 4/2013 | Green et al. | 269/22 |
| 2006/0131820 A1 | * | 6/2006 | Andre et al. | 279/4.03 |
| 2007/0090610 A1 | * | 4/2007 | Hoffmann | 279/4.03 |
| 2007/0216113 A1 | * | 9/2007 | Schuster et al. | 279/2.08 |
| 2008/0048404 A1 | * | 2/2008 | Korson | 279/4.11 |
| 2008/0116649 A1 | * | 5/2008 | Andre | 279/4.12 |
| 2008/0217872 A1 | * | 9/2008 | Hofmann | 279/152 |
| 2010/0164187 A1 | * | 7/2010 | Geng | 279/2.07 |
| 2010/0253015 A1 | * | 10/2010 | Andre | 279/2.08 |

* cited by examiner (a)

(b)

FIXTURE FOR SECURING A THIN-WALLED COMPONENT

The present invention relates to a fixture for securing a thin-walled component, such as a rocket nose cone or a gas turbine aero-engine casing.

WO 2008/107672 (hereby incorporated by reference) discloses an adaptive fixture for thin-walled components, for the purpose of enabling them to be machined with sufficient supporting rigidity and dynamic stability so as to maintain machining precision and surface finish to an acceptable engineering standard. The fixture has an inflatable elastomeric pressure element and a liner which fits between the pressure element and the component. It is particularly applicable to thin-walled components where secure fixture and vibration avoidance during machining is otherwise difficult to achieve.

The thin-walled component may have minor openings and an uneven internal/external surface without changing its character. Such a component is difficult to hold while it is machined. The thin wall lacks sufficient static rigidity and dynamic stability to withstand the cutting force generated in the machining process. The thin wall can become dynamically unstable and liable to vibrate, causing machining precision problems, mainly from the insufficient supporting rigidity. Surface finish problems can also result from the unstable self-excited vibration (known as "chatter") between the cutting-tool and workpiece.

Examples of components which can benefit from the fixture of WO 2008/107672 are gas turbine aero-engine casings and rocket nose cones. Such components are often made from difficult-to-machine material, such as heat-resistant alloy, and there is also a need to reduce component mass. However, in order to provide interfaces for connection of other components, machining work is usually inevitable.

Although the fixture of WO 2008/107672 eliminates or reduces many difficulties encountered when machining thin-walled components, a problem remains that during a machining operation leading to breakthrough of the component wall, or that enlarges an existing aperture in the wall, the liner and pressure element can be damaged. Indeed, the component and machine tool can be damaged in such an operation by high breakthrough forces and/or the presence of machining chips.

Thus, in a first aspect, the present invention provides a fixture for securing a thin-walled component, the fixture including:
- a support having one or more securing devices for securing the component to the support,
- an inflatable pressure element adapted to press, when inflated, against a flexible liner,
- the flexible liner being adapted to fit between the pressure element and a thin wall of the component,
- characterised in that the liner has at least one stiffening element located opposite a position where a machining operation is performed on the other side of the thin wall, the stiffening element holding the liner away from the thin wall to create a cavity between the liner and the thin wall and the inflated pressure element and the flexible liner damp vibrations in the component during machining of another side of the thin wall.

By a "thin-walled component" we mean a component having one or more thin walls. When such a wall is loaded, transverse shear stresses across the wall are generally insignificant relative to stretching and/or bending stresses in the plane of the wall. The thin wall typically lacks sufficient static rigidity to withstand cutting forces generated in machining operations, becoming dynamically unstable and liable to vibrate.

Advantageously, by forming the cavity, the stiffening element can reduce or avoid damage to the liner during machine tool breakthrough. The cavity also reduces breakthrough forces and provides a space for machining chips, thereby reducing or avoiding damage to the tool and the component. The stiffening element also helps the liner to preserve its correct shape by resisting bulging of the liner through a new or enlarged aperture in the thin wall.

Preferably, the cavity provides a stand off of at least 15 mm between the liner and the thin wall at the location where the machining operation is performed.

Typically, the inflatable pressure element is an inflatable elastomeric pressure element. Conveniently, the pressure element is inflated pneumatically. However, it may be inflated by any suitable fluid or gel. The fixture may have more than one pressure element.

Preferably, the support has a retaining element which retains the pressure element in position. For example, the retaining element may provide an annular retaining surface, the component being a cylindrical or shell component, and the pressure element being a tube. In use, the retaining element, component and pressure element may then be concentrically arranged with the pressure element between the retaining element and the component.

By a "cylindrical component" we mean a hollow tubular structure having a through-opening. Such a cylindrical component may approximate to a true cylinder, or may, for example, be more frustoconical in shape. By a "shell component", we mean a bowl-like structure having a single major opening. Such a shell component may be shaped, for example, like a cone or a dome.

Preferably, the liner is a moulded element. Conveniently, the stiffening element can be incorporated into the liner during the moulding thereof.

The liner may be formed of polyurethane. The stiffening element may be formed of nylon.

The liner may have a plurality of stiffening elements.

The component may be a rocket nose cone or a gas turbine aero-engine casing.

A second aspect of the present invention provides a method of forming the liner of a fixture according to the first aspect, the method including the steps of:
- providing the component or a replica thereof,
- locating the or each stiffening element at its respective position relative to the thin wall of the component,
- moulding a layer of flexible material to the thin wall to form the liner such that the layer incorporates the or each stiffening element, and
- releasing the liner from the thin wall.

During the locating step, a spacer may hold the stiffening element from the thin wall of the component to create the cavity.

The stiffening element may be located at its respective position by a fitting which is inserted through an aperture in the component and fastened to the stiffening element.

Embodiments of the invention will now be described by way of example with reference to the accompanying drawings in which.

Figure 1:
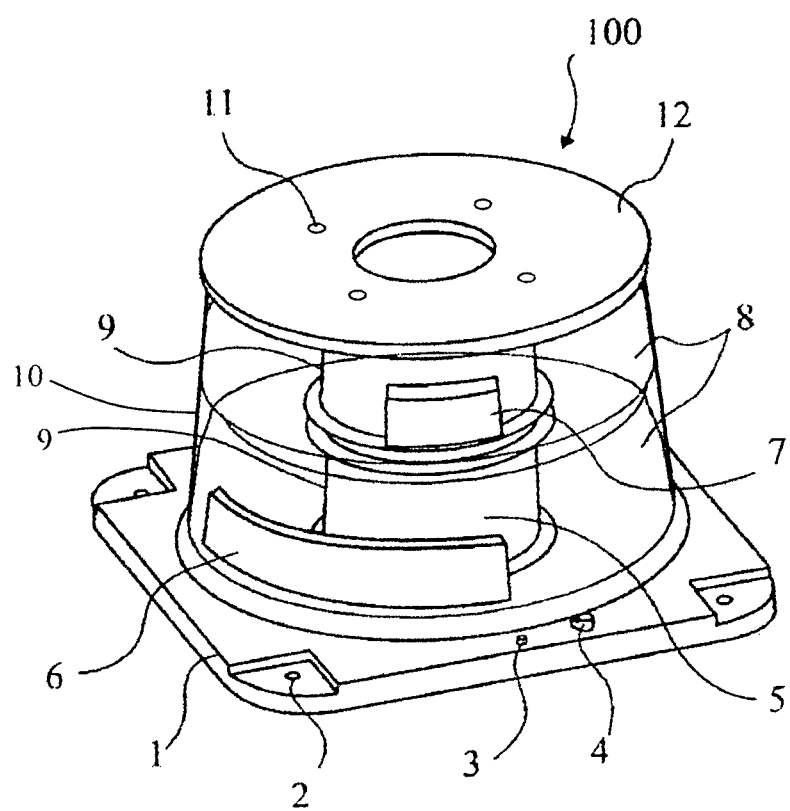
FIG. 1 shows a fixture for the external machining of a thin-walled cylindrical component.

FIG. 1 shows a fixture 100 for the external machining of a thin-walled cylindrical component 10. The fixture comprises a mounting base support 1 in the form of a thick-walled plate having mounting holes 2 for connection to a machine table (not shown) of a machining centre (not shown). Securing devices (pins 3 and clamps 4) locate and clamp the component 10 to the base 1.

A thick-walled rigid arbour or column 5 providing an annular retaining surface is fixed centrally to the base 1 by bolts (not shown). The arbour 5 terminates with a flange to connect to a thick-walled lid 12. Two modified vehicle-wheel inner tubes 8, having an internal radius R corresponding with the radius of the arbour 5, are fitted on the arbour. Being made of elastomeric, resiliently flexible material, the tubes 8 can be inflated to fit the enclosure confined within the cylindrical component 10, support arbour 5, mounting base 1 and lid 12. Each tube 8 has its own air inlet valve 9 on its inner surface, and this is fitted through a respective aperture provided for this purpose on the arbour 5. Each inlet valve 9 is extendable upwardly through the arbour, which is hollow.

A flexible liner 6 (only a portion of which is shown in FIG. 1) wraps around the tubes 8 and spreads a uniform supporting pressure to provide dynamic damping normal to the component surface to be machined. Regional enhancements 7 can be incorporated in the liner.

The lid 12 is a thick-walled circular plate provided with a wedged step (not shown) around its circumference to hold the top end of the cylindrical component. Lid 12 is also provided with holes 11 by which it can be attached to the top end of the internal arbour 5 by bolts (not shown).

A particular form of regional enhancement is a stiffening element located opposite a position where a machining operation is performed on the other side of the thin wall. The stiffening element holds the liner away from the thin wall to create a cavity between the liner and the thin wall.

FIG. 2(a) is a view of an aero-engine turbine casing 10 secured by a fixture like that shown in FIG. 1. The casing has a number of bosses 20 with respective apertures which are formed by machining the material of the bosses. FIG. 2(b) is a view through one of the apertures of a boss to a cavity created in the flexible liner 6 by stiffening element 21. If the liner had no cavities, it would press firmly against the inner wall of the component all around the circumference, and including into the bosses. When machining the apertures in the bosses, the drilling or milling tool would break through the inner wall of the casing and begin to machine the liner, causing damage to the liner. This would be undesirable as it would preclude the liner being used for more than one casing. Further, the damage could progress through the inner liner and perforate the inflatable tubes. Any damage to the tubes would then disable the fixture, causing the damping effect provided by the fixture to cease.

Additionally, drilling and milling tools are sensitive to changes in section, and higher forces occur when they break through the inner wall of the casing. If the cavity were not created in the inner liner at this point, the combination of the breakthrough forces with the presence of machining chips could lead to damage of the cutting tool and the component.

Thus the cavities formed by stiffening elements 21 advantageously reduce or avoid damage to the liner, tubes, casing and tools.

Figure 2:
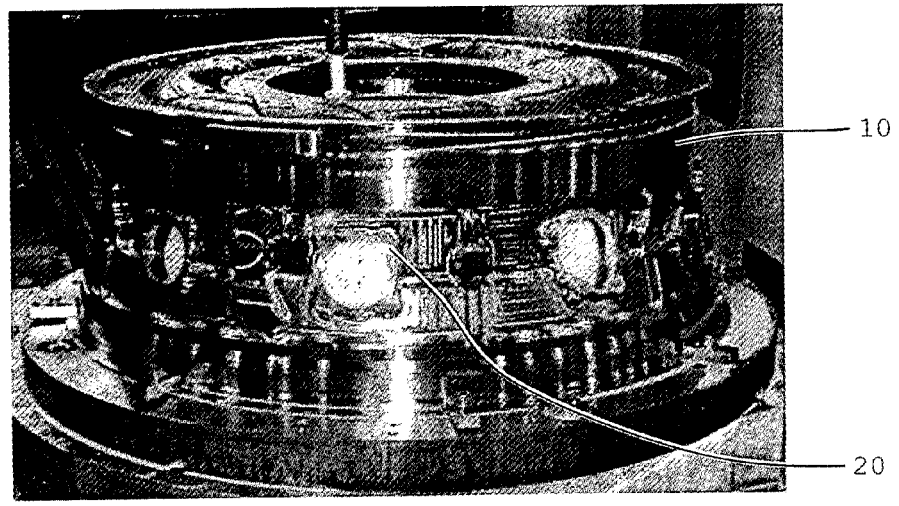
FIG. 2(a) is a view of an aero-engine turbine casing secured by a fixture such as that shown in FIG. 1.
FIG. 2(b) is a view through an aperture in the thin wall of the casing to a cavity created in the flexible liner of the fixture.
Figure 2:
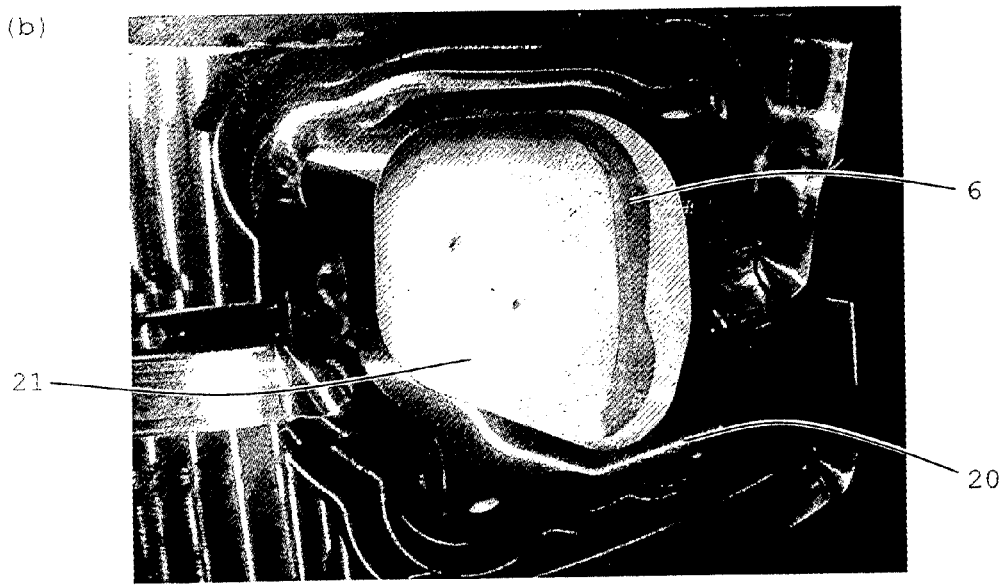
Figure 3:
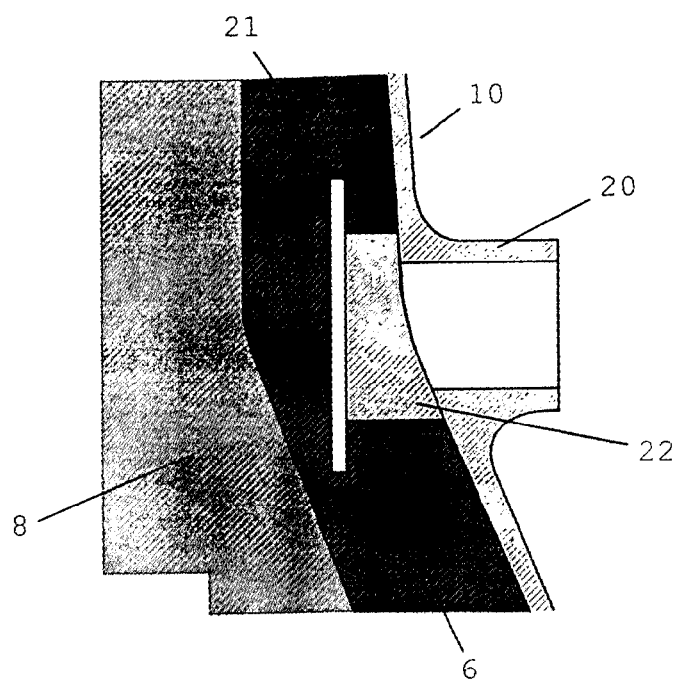
FIG. 3 shows a schematic cross-section through a portion of the fixture and the casing of FIG. 2.
Figure 4:
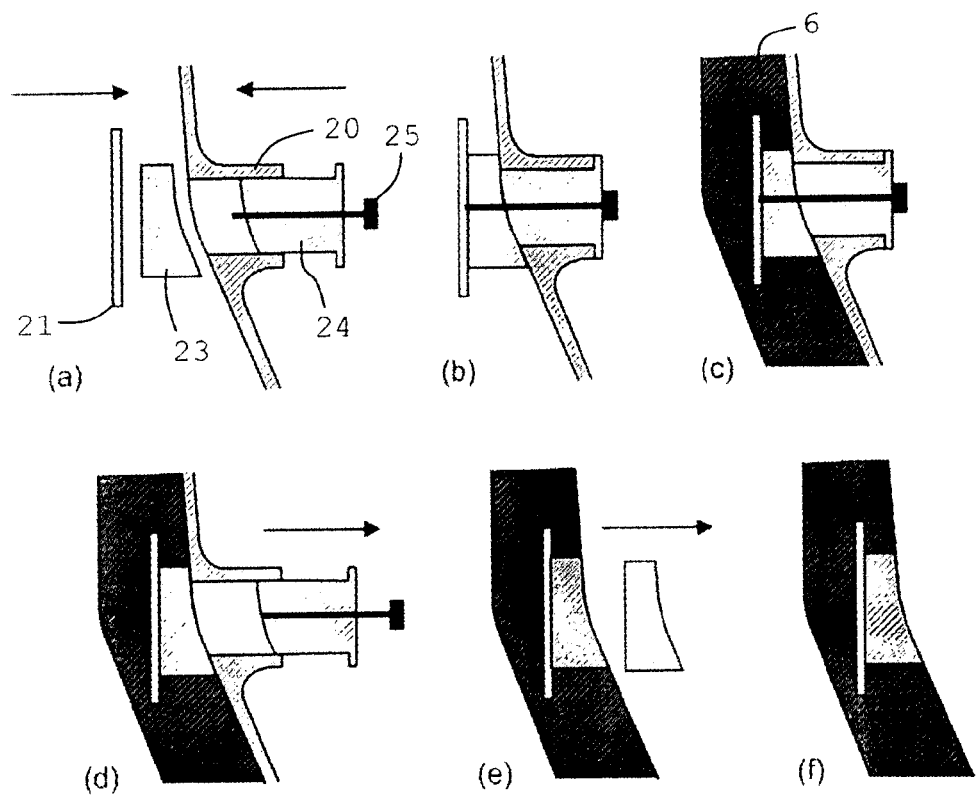
FIGS. 4(a) to (f) show, on schematic cross-sections similar to that of FIG. 3, a moulding process for forming the liner of FIGS. 2 and 3.

FIG. 3 shows a schematic cross-section through a portion of the fixture and the casing of FIG. 2. The section is taken through one of the bosses 20 and shows the cavity 22 formed by the stiffening element 21. The cavity created in the liner is deep enough so that a drilling or milling tool can completely breakthrough the wall of the casing, and is oversized to ensure that no damage occurs to the liner at the edges of the cavity.

The stiffening element 21 takes the form of circular nylon backing plate embedded in the flexible liner material. The plate bridges over the aperture which the cavity has been created for and ensures that when the aperture is created the liner maintains its form (i.e. does not bulge through the aperture).

The liner 6 is created from polyurethane through a moulding process that uses as the mould an engine casing of the type that the liner is to be applied to. However, to help with the positioning of the nylon plates, the casing used as the mould already has apertures in the bosses. The moulding process is shown schematically in FIGS. 4(a) to (f), which are cross-sections similar to that of FIG. 3.

To embed the nylon plate 21 in the liner, inner 23 and outer 24 plastic spacers are used. The spacers and nylon plate are attached to the casing prior to the moulding process using a bolt 25. The inner spacer 23 defines the final shape of the cavity, while the outer spacer 24 centres the inner spacer and nylon plate on the aperture of the boss 20. The spacers, plate and bolt are shown being assembled in FIG. 4(a), and in position in FIG. 4(b).

Next, as shown in FIG. 4(c), the liner 6 is moulded by forming a layer of polyurethane on the inner surface of the casing. The polyurethane is allowed to cure, and then the bolt and outer spacer are removed (FIG. 4(d)). The cured liner is released from the casing, allowing the inner spacer also to be removed (FIG. 4(e)). FIG. 4(f) shows the completed liner, incorporating the nylon plate, ready for use.

The fixtures of FIGS. 1 to 4 are suitable for supporting the inner side of a thin wall during machining of the outer side of the wall. However, the present invention can equally be applied to a fixture for supporting the outer side of a thin wall during machining of the inner side thereof.

Further, although the present invention has been described in FIGS. 1 to 4 in relation to a component such as an aero-engine casing, it is applicable to the machining of many other thin walled components.

The invention claimed is:

1. A fixture for securing a thin-walled component, the fixture comprising:
   a support having one or more securing devices that secures the component to the support, and
   an inflatable pressure element having an internal volume and an external surface, the external surface pressing a flexible liner when inflated,
   the flexible liner having a first surface that presses the external surface of the inflatable pressure element and a second surface that presses a thin wall of the component when the inflatable pressure element is inflated, the liner being disposed between the pressure element and the thin wall of the component,
   wherein the flexible liner incorporates at least one stiffening element located opposite a position on an outer side of the thin wall of the component where a machining operation is performed, the stiffening element being embedded within the liner and holding the liner away from the thin wall by a spacer such that there is a cavity between the thin wall and the stiffening element, and the inflated pressure element and the flexible liner damp vibrations in the component during machining of the outer side of the thin wall.

2. A fixture according to claim 1 wherein the liner is a moulded element.

3. A fixture according to claim 1, wherein the liner is formed of polyurethane.

4. A fixture according to claim 1, wherein stiffening element is formed of nylon.

5. A fixture according to claim 1, wherein the liner has a plurality of stiffening elements.

6. A fixture according to claim 1, wherein the component is a rocket nose cone or a gas turbine aero-engine casing.

7. A method of forming the liner of the fixture according to claim 1, the method comprising the steps of:
providing the component or a replica thereof,
locating the or each stiffening element at its respective position relative to the thin wall of the component,
moulding a layer of flexible material to the thin wall to form the liner such that the layer incorporates the or each stiffening element, and
releasing the liner from the thin wall.

8. A method of forming a liner of a fixture for securing a thin-walled component, the fixture comprising:
a support having one or more securing devices for securing the component to the support, and
an inflatable pressure element adapted to press, when inflated, against a flexible liner,
the flexible liner being adapted to fit between the pressure element and a thin wall of the component,
wherein the flexible liner has at least one stiffening element located opposite a position where a machining operation is performed on the other side of the thin wall, the stiffening element holding the liner away from the thin wall to create a cavity between the liner and the thin wall, and the inflated pressure element and the flexible liner damp vibrations in the component during machining of another side of the thin wall,
the method comprising the steps of:
providing the component or a replica thereof,
locating the or each stiffening element at its respective position relative to the thin wall of the component by a spacer that holds the or each stiffening element from the thin wall of the component to create a cavity,
moulding a layer of flexible material to the thin wall to form the liner such that the layer incorporates the or each stiffening element, and
releasing the liner from the thin wall.

9. A method of forming a liner of a fixture for securing a thin-walled component, the fixture comprising:
a support having one or more securing devices for securing the component to the support, and
an inflatable pressure element adapted to press, when inflated, against a flexible liner,
the flexible liner being adapted to fit between the pressure element and a thin wall of the component,
wherein the flexible liner has at least one stiffening element located opposite a position where a machining operation is performed on the other side of the thin wall, the stiffening element holding the liner away from the thin wall to create a cavity between the liner and the thin wall, and the inflated pressure element and the flexible liner damp vibrations in the component during machining of another side of the thin wall,
the method comprising the steps of:
providing the component or a replica thereof,
locating the or each stiffening element at its respective position relative to the thin wall of the component by a fitting which is inserted through an aperture in the component and fastened into the or each stiffening element,
moulding a layer of flexible material to the thin wall to form the liner such that the layer incorporates the or each stiffening element, and
releasing the liner from the thin wall.

10. A fixture according to claim 1, wherein the cavity has an aperture opening to the second surface.

11. A fixture according to claim 10, wherein the stiffening element provides one wall of the cavity.

12. A fixture according to claim 11, wherein the stiffening element bridges over the aperture.

13. A fixture according to claim 1, wherein the stiffening element bridges over the aperture.

* * * * *